(12) United States Patent
Dubost et al.

(10) Patent No.: US 10,444,402 B2
(45) Date of Patent: Oct. 15, 2019

(54) AUTOMATIC FLUID CODING AND HYDRAULIC ZONE DETERMINATION

(71) Applicant: Schlumberger Technology Corporation, Sugar Land, TX (US)

(72) Inventors: Francois Dubost, Idron (FR); Yannick Guyomar, Montpellier (FR); Olivier Marché, Grabels (FR); Cosan Ayan, Istanbul (TR); Florent d'Halluin, Grabels (FR); Sylvain Wlodarczyk, Saint-Clément-do-Rivière (FR)

(73) Assignee: Schlumberger Technology Corporation, Sugar Land, TX (US)

( * ) Notice: Subject to any disclaimer, the term of this patent is extended or adjusted under 35 U.S.C. 154(b) by 1582 days.

(21) Appl. No.: 13/901,844

(22) Filed: May 24, 2013

(65) Prior Publication Data
US 2013/0317752 A1    Nov. 28, 2013

Related U.S. Application Data

(60) Provisional application No. 61/652,079, filed on May 25, 2012.

(51) Int. Cl.
    *G01V 11/00*          (2006.01)
    *G06F 17/18*          (2006.01)
    *E21B 49/00*         (2006.01)

(52) U.S. Cl.
    CPC .......... *G01V 11/002* (2013.01); *E21B 49/008* (2013.01); *G06F 17/18* (2013.01)

(58) Field of Classification Search
    CPC ..... G01V 11/002; G06F 17/18; E21B 49/008; E21B 47/06
    See application file for complete search history.

(56) References Cited

U.S. PATENT DOCUMENTS

| | | | |
|---|---|---|---|
| 6,101,447 A | * | 8/2000 | Poe, Jr. ................... E21B 49/00 702/13 |
| 6,672,386 B2 | | 1/2004 | Krueger et al. |
| 7,216,533 B2 | | 5/2007 | McGregor et al. |

(Continued)

OTHER PUBLICATIONS

Unknown, "10 Ways a Reservoir Engineer Optimizes Reservoir Development", Sep. 24, 2015, Opportune, pp. 1-2.*

(Continued)

*Primary Examiner* — Mischita L Henson

(57) ABSTRACT

Systems, methods, and media for processing formation pressure test data are provided. The method includes determining using a processor, a plurality of regressions for measurements of the formation pressure test data, and determining that two or more of the plurality of regressions represent a fluid code. The method also includes combining the two or more of the plurality of regressions representing the fluid code to generate a first fluid-type regression, and combining two or more other ones of the plurality of regressions representing a second fluid code to generate a second fluid-type regression. The method further includes determining that the first fluid-type regression and the second fluid-type regression are in a first hydraulic zone, and calculating a location of a boundary between the first fluid-type regression and the second fluid-type regression by extrapolating the first and second fluid-type regressions to a point of intersection therebetween.

25 Claims, 5 Drawing Sheets

(56) References Cited

U.S. PATENT DOCUMENTS

| | | | |
|---|---|---|---|
| 7,996,154 | B2 | 8/2011 | Zuo et al. |
| 8,132,453 | B2 | 3/2012 | Thambynayagam et al. |
| 8,271,248 | B2 | 9/2012 | Pomerantz et al. |
| 2006/0241867 | A1* | 10/2006 | Kuchuk ............... E21B 49/00 702/13 |
| 2008/0040086 | A1* | 2/2008 | Betancourt ........... E21B 49/00 703/10 |
| 2012/0199397 | A1* | 8/2012 | Wessling ............. E21B 47/06 175/57 |
| 2012/0232859 | A1 | 9/2012 | Pomerantz et al. |

OTHER PUBLICATIONS

Betancourt, Soraya et al., "Advancing Fluid-Property Measurements", Autumn 2007, Oilfield Review, pp. 56-70.*

Betancourt, et al., "Predicting Downhole Fluid Analysis Logs to Investigate Reservoir Connectivity", IPTC 11488, presented at International Petroleum Technology Conference in Dubai, U.A.E., Dec. 4-6, 2007.

Indo, et al., "Asphaltene Nanoaggregates Measured in a Live Crude Oil by Centrifugation," Energy & Fuels, 2009, vol. 23, pp. 4460-4469.

Kabir et al., "How Reliable is Fluid Gradient in Gas/Condensate Reservoirs?," SPE Gas Technology Symposium held in Calgary, Alberta, Canada, May 14-17, 2006.

Larsen, et al., "Fluid Pressure Gradients in Tight Formations," SPE Europec/EAGE Annual Conference and exhibition held in Amsterdam, The Netherlands, Jun. 8-11, 2009.

Mullins, et al., "Asphaltene Gravitational Gradient in a Deepwater Reservoir as Determined by Downhole Fluid Analysis", SPE International symposium on Oilfield Chemistry held in Houston, TX U.S.A. Feb. 28-Mar. 2, 2007.

Schlumberger, "Fundamentals of Formation Testing" produced by Schlumberger Marketing Communications, 2006.

Stewart, et al., "The Interpretation of Vertical Pressure Gradients Measured at Observation Wells in Developed Reservoirs," 57th Annual Fall Technical Conference and Exhibition of the Society of Petroleum Engineers of AIME, held in New Orleans, LA, Sep. 26-29, 1982.

Examination Report for the equivalent UK patent application 1309412.3 dated Jun. 28, 2018.

Examination Report for the equivalent UK patent application 1309412.3 dated Aug. 16, 2018.

Examination Report for the equivalent UK patent application 1309412.3 dated Nov. 2, 2018.

* cited by examiner

AUTOMATIC FLUID CODING AND HYDRAULIC ZONE DETERMINATION

CROSS-REFERENCE TO RELATED APPLICATION

This application claims priority to U.S. Provisional Application having Ser. No. 61/652,079, filed on May 25, 2012. The entirety of this provisional application is incorporated herein by reference.

BACKGROUND

Processes for determining the characteristics and locations of underground fluids are conducted for a variety of reasons. For example, the information may be useful in exploration settings to determine amount and composition of certain reservoir fluids, which may aid in creating development plans and in monitoring reservoir performance. Further, a single fluid or multiple, more or less immiscible fluids, may be found in a single reservoir unit or "hydraulic zone," and, for example, the economic importance, fluid flow characteristics, and/or other considerations may be contingent upon the relative composition of, for example, water versus hydrocarbon in the hydraulic zone.

Formation pressure testing is the most common way in which such characterization processes may be implemented. Formation pressures along depth, and the change in pressure over the change in depth, of a wellbore may be indicative of the fluid types in the formation. Generally, static formation pressure tests are conducted at locations along a wellbore and the results are interpreted by a skilled operator, who in turn determines the location and composition of the fluids in the various zones. However, in some cases, the number of formation tests taken and the number of analyses needed may result in interpretation of the data by the operator, or even a team of operators—this can be time-consuming and expensive. Furthermore, some of the data points may be reflective of noise or large uncertainty.

SUMMARY

Systems and methods are disclosed for fluid coding and hydraulic zone determination. In at least one example, a series of formation pressure tests may be conducted and the results received into a processing system. The change in pressure over the change in elevation (depth) may be approximately proportional to the density of the fluid in the formation; thus, the slope of a regression between identified fluid codes may be illustrative of the density of the fluid of the fluid code. To determine the regression(s), the processing system may quantify the uncertainty associated with the formation pressure tests, based on one or more of several possible factors. These uncertainty values may then be used to weigh sliding regressions of the measurements. The sliding regressions may be used to filter out "bad" measurements and may be combined, where appropriate, to form the fluid codes.

The fluid codes may then be compared to determine whether adjacent fluid codes are located in the same or different hydraulic zones. When the fluid codes are located in the same zone, their intersection location (i.e., fluid boundary or "free water level") may be calculated by extrapolating the regressions beyond the last measurement of the shallower fluid code and the first measurement of the deeper fluid code, until the regression lines intersect. The uncertainties in this location may then be determined. The result may be a comprehensive display of hydraulic zones and fluid codes thereof, including, the locations of fluid boundaries within the hydraulic zone, which may then be employed for development and/or reservoir monitoring.

It will be appreciated that this summary is intended merely to introduce a subset of aspects of the disclosure, presented below. Accordingly, this summary is not to be considered limiting, on the disclosure.

BRIEF DESCRIPTION OF THE DRAWINGS

The accompanying drawings, which are incorporated in and constitute a part of this specification, illustrate embodiments of the present teachings and together with the description, serve to explain the principles of the present teachings. In the figures.

DETAILED DESCRIPTION

Figure 1:
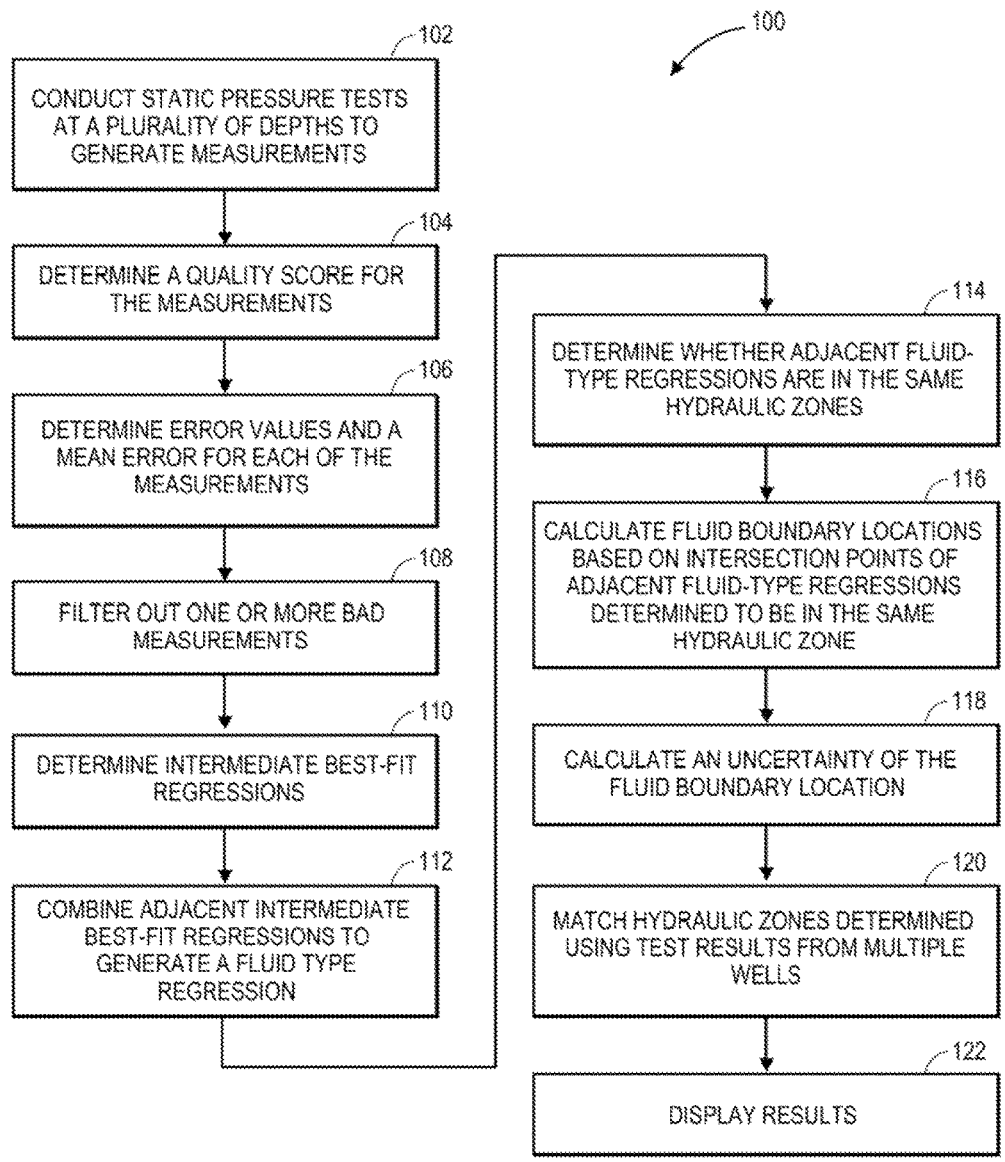
FIG. 1 illustrates a flowchart of a method for automatic fluid coding and hydraulic zone determination.

The following detailed description refers to the accompanying drawings. Wherever convenient, the same reference numbers are used in the drawings and the following description to refer to the same or similar parts. While several embodiments and features of the present disclosure are described herein, modifications, adaptations, and other implementations are possible, without departing from the spirit and scope of the present disclosure.

FIG. 1 illustrates a flowchart of a method 100 for fluid coding and hydraulic zone determination, according to an embodiment. As the term is used herein, a "fluid code" is generally defined to mean a discrete volume of a type of fluid, generally illustrated by a plurality of formation test measurements. For example, two immiscible fluids may be in contact with one another, yielding two fluid codes. Two miscible fluids or a single type of fluid may also form two fluid codes, if they are separated into different hydraulic zones. In turn, "hydraulic zone" is generally intended to mean a reservoir unit i.e., a discrete location where fluid is found in a subterranean formation and generally prevented from fluid communication with fluids in other hydraulic zones.

The method 100 may begin by conducting a vertical pressure profile test, e.g., a series of static pressure tests at a plurality of depths, as at 102. Formation pressure testing generally includes determining the static pressure of fluids within the pores of a reservoir, typically the equivalent to the pressure exerted by a column of liquid (which may be higher density than water) extending from the depth to sea level. Generally, this is expressed as the density of fluid required in the wellbore to balance the pore pressure. Various fluids may evidence different characteristic formation pressure increase over depth increase. The composition, including, salinity, dissolved gases and minerals gasses, type of fluid (e.g., hydrocarbon or water), burial history, temperature, etc., may affect this measurement; as such, the measurement may provide information indicative of the density and therefore type of fluid in the wellbore. Moreover, each measurement may be expressed as a couple: pressure and depth. Further, while this information may be plotted, the measurements themselves may be considered "non-visual" (i.e., numerical data).

After each measurement, batch of measurements, or after the completion of taking measurements at 102, the method 100 may proceed to determining a quality score for one, some, or each of the measurements, as at 104. In some instances, the quality score may be referred to as the quality control score, abbreviated as QC. The quality control score may be evaluated depending on testing conditions, which may include conditions of the formation being tested, and may be influenced by the testing equipment employed, and/or any other factors. For example, such characteristics may include low drawdown mobility, low pretest volume, a high 60 second slope of pressure versus time, high gauge noise expressed as pressure variance, and/or low temperature stability. Each of these conditions may, for example, indicate an increased uncertainty in the measurement. Accordingly, as these conditions increase, the uncertainty may rise, resulting in a lower quality control score.

In an embodiment, the quality control score may be calculated according to the following equation:

$$QC = (100 - \Sigma_{k=0}^{n}(Wk \times Ck)/\Sigma_{k=0}^{n}(Wk \times 25)) \times R \quad (1)$$

where Wk is a user-defined weight for each of the criteria. As an example, the weight may be 1 as a default, but may be reduced to a point between 0 and 1 (inclusive of 0) as determined by an operator, by well conditions, or according to any other factor. Ck is a value determined according to one or more criteria values. The Ck values may be set to a minimum value (e.g., zero) if a threshold level for the uncertainty criteria is not reached, and set to a non-zero, maximum value (e.g., 25) if the threshold level is met or exceeded, indicating the presence of uncertainty based on that criteria and thus lowering the QC score. In other embodiments, one or more of the Ck values may be set proportionally to the value of the criteria, rather than or in addition to a step-wise manner. In various embodiments, any calculation for each of the criteria may be employed. In one specific embodiment, among many contemplated, the criteria values may be determined as follows:

C1: drawdown mobility: a minimum value (e.g., 0) if mobility is greater than 1 mD, a maximum value (e.g., 25) if not;

C2: pretest volume: a minimum value (e.g., 0) if volume is greater than 5 cc, a maximum value (e.g., 25) if not:

C3: 60 s slope: a minimum value (e.g., 0) if the slope is between −0.022 psi/min (−151.7 Pa/min) and 0.022 (151.7 Pa/min) psi/min, otherwise a maximum value (e.g., 25); and C4: gauge noise expressed as pressure variance: a maximum value (e.g., 25) if the pressure variance is greater than 0.3 psi (2.07 kPa), a minimum value (e.g., 0) otherwise.

Furthermore, the QC equation (1) may include a weighting value 'R' indicative of a repeatability criterion. The weighting R may be computed first by calculating a pretest score, which may be the QC score calculated neglecting or otherwise omitting the R variable. The reference and any other test scores within an acceptable range are then calculated; if the other measurements are within a predetermined or user-defined acceptable variation, the tests may be weighted as a first number (e.g., 1). Otherwise, the tests may be weighted as a second number (e.g., 0.5). Accordingly, the repeatability of the formation pressure test in total may be employed to weigh the quality control score of the tests as a whole, which may scale the quality control score differentials caused by the criteria value assessments described above.

Further, the distribution of static pressure measurements along true vertical depth, if falling under a common pressure gradient (for example, in a virgin reservoir), for a unique hydraulic zone, gives information about the extent of the connected hydraulic zone and the fluid content, given the direct relationship between the pressure gradient, i.e. the variation of pressure with true vertical depth and the fluid density. The relationship and the pressure gradient expression may be calculated as follows:

$$\frac{dp}{dz} = g\rho - \frac{\mu}{K}\left(\sum_{k}^{n_c} \frac{\alpha_k}{\rho_k} J_k + \sum_{k}^{n_c} (\alpha_k L_{kq})\frac{d\theta}{dz}\right) \quad (2)$$

where g is acceleration due to gravity, ρ is fluid density, the second term is indicative of external fluxes, and the third term is indicative of thermal diffusion. However, the predominate contribution to the variation of pressure with vertical depth may be the gravity term; therefore, the expression may be approximated as:

$$dp/dz = g\rho \quad (3)$$

where dp/dz is the pressure gradient, i.e., the change in pressure over the change in elevation (i.e., the pressure gradient).

Accordingly, pressure gradient may be approximately proportional to the density. Further, in a plot of a line representing depth versus formation pressure, the pressure gradient may be the inverse of the slope of the line. As such, the densities may be determined by calculating regressions, and the slopes of the regressions, among a plurality of measurements, once the measurements are parsed into groups representing each fluid code in each hydraulic zone.

The method 100 may then proceed to determining fit error values and a mean error for each of the measurements, as at 106. Such determination at 106 may proceed by calculating a local or "sliding" regression using three points for each of the measurements. It will be appreciated that other numbers of points may be used in the regressions, with three being merely an illustrative example employed herein. Furthermore, the regression analysis may weigh certain measurements differently, for example, based at least partially on the quality control scores for the measurements calculated above. After the list of regression fit errors is calculated, a simple arithmetic mean, or another type of mean, may be calculated. The fit error(s) of the measurements may then be compared to the mean error (e.g., each of the fit errors for each of the measurements). Any suitable regression technique may be employed, including least-mean squares, to determine fit error and/or correlation coefficients.

For example, if three consecutive three-point regressions have an error above the mean error value, the measurement contained in all three of the regressions may be determined to be a "bad" measurement, and may be filtered out or otherwise ignored from further analysis, as at 108. Filtering at 108 may further include determining that two measurements are too close in terms of measured depth, with different measured pressure values. In such case, a decision may be made as to which of the measurements is more accurate and/or reliable. This decision may be based, for example, on regression error, quality score, or a combination of the two.

The method 100 may then proceed to determining an intermediate best-fit regression or regressions for the measurements, as at 110. This determination may begin with the three-point regressions described above, such that each measurement is included in up to three regressions. The determining at 110 may then proceed to selecting a best-fit from among the three-point regressions. This may proceed by comparing error values, proximity to measurements with higher quality control scores, and/or using any other suitable factor to make a selection. The regressions selected may be referred to as the "intermediate best-fit" regressions.

The method 100 may then proceed to combining adjacent intermediate best-fit regressions to generate a fluid code or fluid-type regression, as at 112. Such combination may proceed by determining a slope for each of the intermediate best-fit regressions. The slope, as described above, may be related to the fluid density and thus the same or similar slopes between adjacent regressions may be indicative of the measurements being of the same, continuous fluid at different depths. Accordingly, when the slope of a first intermediate best-fit regression is within a threshold value of a slope of a subjacent, second intermediate best-fit regression, a determination may be made that the adjacent regressions describe the same fluid and thus may be combined. The threshold may be a user-defined input, or may be preset, user-defined, and/or calculated based on quality scores (e.g. a mean or media quality score) and/or any other factor. In some cases, a difference in depth between the deepest measurement of a superposed intermediate best-fit regression and a shallowest measurement of a subjacent intermediate best-fit regression may be considered when determining if the regressions are part of the same fluid code. Thus, if the two regressions are separated by greater than a threshold depth, they may be considered to be in separate fluid codes.

With two or more fluid codes or fluid-type regressions determined, the method 100 may proceed to determining whether two of the fluid codes are located in the same hydraulic zone, as at 114. If two fluid codes are located in the same hydraulic zone they may have a fluid boundary therebetween, where the two fluid codes meet. This may be referred to as a free water level. Accordingly, if two fluid codes are determined using the regression processes described above and are in proximity to one another, they may be found in a single hydraulic zone, or they may be separated and located in two proximate, but discrete, hydraulic zones.

Accordingly, the determining at 114 may proceed by, for example, applying a set of predetermined rules regarding the physical characteristics of fluids in reservoirs. By way of example, the determining 114 may begin by assigning a first fluid code to a first hydraulic zone. The next deeper (subjacent) fluid code may then be considered, in order to determine whether it is found in the same hydraulic zone as the first fluid code. To do so, the densities represented by the regressions of the first and second fluid codes may be compared. If the density of the first code is greater than the density of the deeper (subjacent), second code, then the two fluid codes may be ruled out as being contained in the same hydraulic zone. Without being bound by theory, this is because the denser fluid cannot be in fluid communication with the less-dense fluid and be at a higher elevation than floating in the lower-density fluid. As such, the less-dense fluid code being above the denser fluid code may be a necessary, but not necessarily sufficient, condition for the two fluid codes being in the same hydraulic zone.

The determining at 114 may also consider the pressure measurements in the two fluid codes. Accordingly, if the last measurement taken in the shallower (superposed) first fluid code is less than the first measurement of the second, deeper (subjacent) fluid code, it may be indicative of the two fluid codes being in the same hydraulic zone. On the other hand, if the superposed fluid code is at a higher pressure than the subjacent fluid code, then the two fluid codes do not belong to the same hydraulic zone.

Similarly, the regressions of the two fluid codes may be extrapolated, as will be discussed below, such that the fluid codes intersect, showing a contact depth between the fluid codes that may exist if the fluid codes are in the same hydraulic zone. If this extrapolated intersection point is located at an intermediate depth between the last (deepest) measurement of the first fluid code and the first (shallowest) measurement of the second, subjacent fluid code, it may also be indicative of the first and second fluid codes being in the same hydraulic zone.

In an embodiment, if these three conditions (ordering of density, ordering of pressure measurements, and location of intersection) are satisfied, the two fluid codes may be considered to be contained in the same hydraulic zone. Otherwise, the two fluid codes may be determined to be in separate hydraulic zones. Although three particular example factors are described herein, it will be appreciated that other measurements, characteristics, ordering, etc. may be compared as between adjacent fluid codes to determine whether the fluid codes are in the same hydraulic zone. Such other factors may be viewed in conjunction with those described herein or separate. Moreover, in some cases, all three factors may not need to be satisfied and/or determined to yield a determination as to whether the adjacent fluid codes are in the same hydraulic zone.

Further statistical analysis on the pressure gradients may be conducted to determine whether adjacent gradients are indeed statistically different. Such statistical analyses may include any suitable method for testing a correlation hypothesis, including, for example, a Student-T test.

Figure 2:
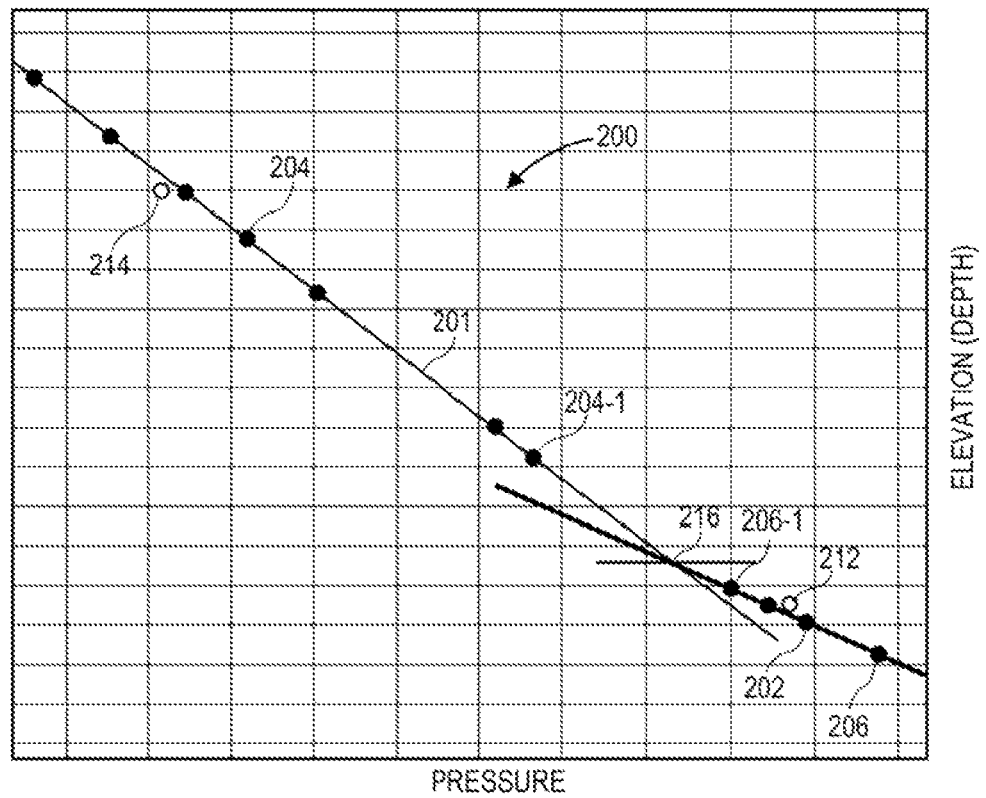
FIG. 2 illustrates a plot of an analysis of a series of formation tests distributed versus depth, including fluid codes of a hydraulic, zone, according to an embodiment.

The method 100 may also include calculating a fluid contact or boundary point locations based on the extrapolated intersection points between two fluid codes determined to be in the same hydraulic zone, as at 116. With continuing reference to FIG. 1, FIG. 2 illustrates a plot of a set of formation pressure tests for an example of a hydraulic zone 200, according to an embodiment, which illustrates the calculation at 116.

As shown in FIG. 2, two fluid codes 201 and 202 are developed. Each fluid code 201, 202 may be formed by a linear regression, e.g., as determined at 112. As such, each fluid code 201, 202 may include a plurality of measurements 204 and 206, respectively. The size of the dots indicating the measurements 204, 206 may be proportional to the quality control score, which, as described above, may inform the regression process, with larger dots indicating higher quality control scores. Further, certain measurements, such as bad measurements 210, 212, may be excluded from the analysis based on, for example, proximity in depth to better quality control scores. Further, the bad measurements 210, 212 may be depicted such that they are easily recognizable, such as with an unfilled circle, in contrast to the filled circles of the used measurements 204, 206, for example.

Moreover, the fluid codes 201, 202 may meet the conditions for being in the same hydraulic zone 200. For example, the pressure gradient indicated by the slope of fluid code 201 is less than the pressure gradient indicated by the slope of fluid code 202. Since density is proportional to the pressure gradient, then the fluid code 201, which is superposed with respect to the second fluid code 202, has a lower density than the second fluid code 202 (i.e., the less dense is above the more dense). Furthermore, the last measurement 204-1 of the first fluid code 201 is at a shallower depth than the first measurement 206-1 of the deeper second fluid code 202. Also, an intersection point 216 found by extrapolating the fluid codes 201, 202 is located at a depth that is intermediate the last measurement 204-1 and the first measurement 206-1. Thus, the intersection point 216 may be considered to be a physically real point where the two fluid codes 201, 202 form a fluid boundary.

Figure 3:
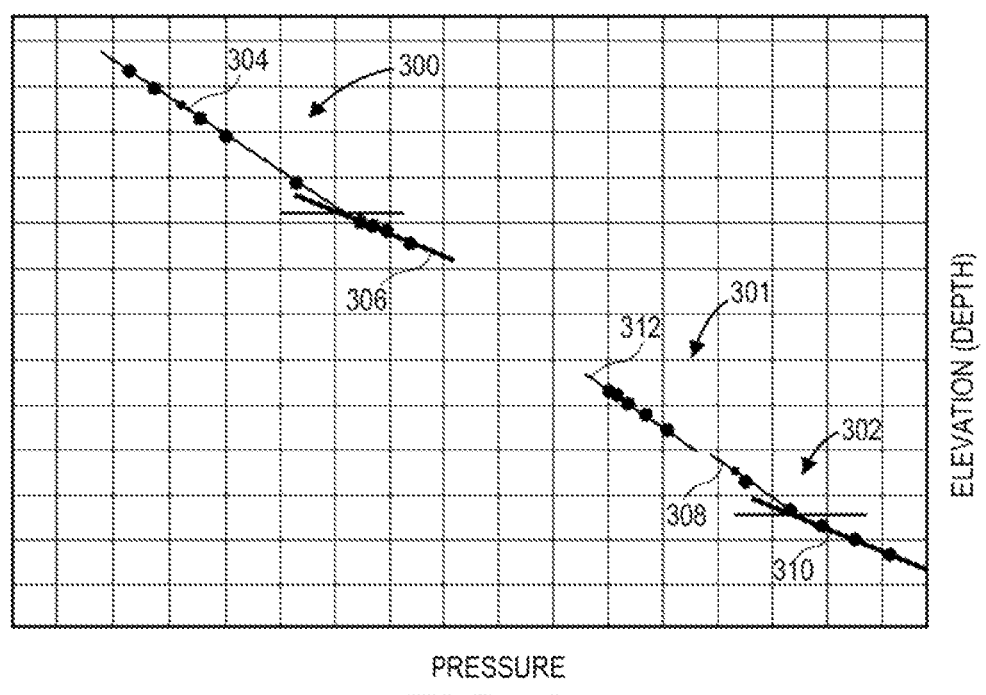
FIG. 3 illustrates a plot of an analysis of a vertical pressure profile, including fluid codes of three hydraulic zones, according to an embodiment.

With continued reference to FIG. 1, FIG. 3 illustrates three hydraulic zones 300, 301, 302. The hydraulic zones 300 and 302 each include two intersecting fluid codes 304, 306, 308, 310. The second hydraulic zone 301, however, has a single fluid code 312. Accordingly, operation of the method 100 may, in this example, result in a determination that fluid code 312 is not found in either of the hydraulic zones 300, 302 including the adjacent fluid codes 306, 312. The regression defining the fluid code 302 may be similar to but outside the scope of allowable slope variation or error from the adjacent fluid code 308. Further, since their intersection would not be between, in terms of depth, the fluid codes 312 and 308, the fluid codes 308, 312 are determined not to be part of the same hydraulic zone. Moreover, the fluid code 312 evidences a lower pressure gradient, and thus density, than fluid code 306. Since fluid code 306 is at a shallower depth than less-dense fluid code 312, it could be decided that the possibility of the fluid codes 306 and 312 intersecting may be ruled out. As discussed above, by extrapolating the regression lines of the intersecting fluid codes 304-310, the depth of the fluid boundary for the multi-fluid containing hydraulic zones 300, 302 may be determined.

Figure 4:
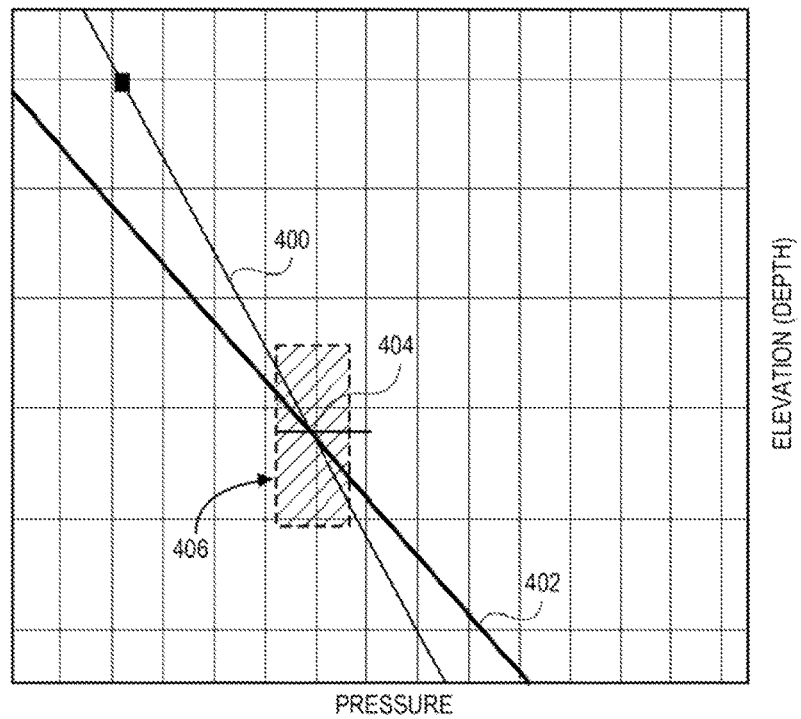
FIG. 4 illustrates a plot of art uncertainty calculation for a location of a fluid boundary between two fluid codes of a hydraulic zone, according to an embodiment.

Returning to FIG. 1, the method 100 may also include calculating an uncertainty of the fluid boundary location, as at 118. FIG. 4 graphically depicts such a calculation in a formation pressure test, according to an embodiment. As shown in FIG. 4, two fluid codes 400, 402 intersect at a fluid boundary 404. The individual test interpretations may have been given a quantitative pretest quality assessment, i.e., the quality control score determined at 104. This quality control score may be carried over into uncertainty in the static formation pressure measurements, which may have been used to weigh the regressions determined at 110 and 112, at least and which, in turn, were employed to form the fluid codes and hydraulic zones.

Accordingly, a Monte Carlo process may be used to generate uncertainties in the fluid boundary location, for example, by varying pressure and depth errors. Additionally or alternatively, the uncertainties may be calculated from statistical errors and confidence intervals in the measurements and the creation of the regressions, as well as errors and uncertainties in their combination, thereby determining the uncertainty around the extrapolated intersection of the two fluid codes 400, 402. The range of uncertainty may be graphically depicted as zone 406, as shown, and may graphically or otherwise depict the confidence level of the location of the fluid boundary based on uncertainties.

Figure 5:
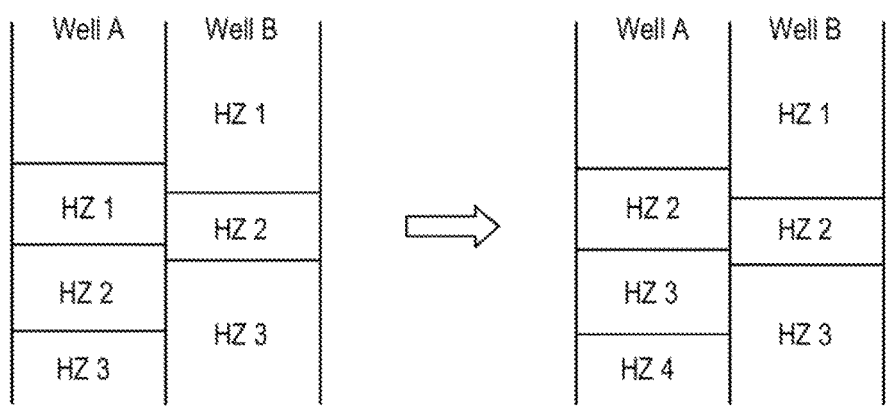
FIG. 5 illustrates a schematic view of matching hydraulic zones between two wells, according to an embodiment.

Referring again to FIG. 1, the method 100 may also include matching the hydraulic zone determinations for interpretations gathered for multiple wellbores in an area, as at 120. In some cases, one or more of the hydraulic zones intersected by one wellbore may not extend to the location of another wellbore, while others may. An example of this situation is illustrated schematically in FIG. 5, according to an embodiment. In this case, three hydraulic zones are found in the formation test of well A, and three are found in the formation pressure test of well B. However, the boundary between HZ1 and HZ2 in well A is more closely positioned to the boundary between HZ2 and HZ3 in well B, rather than the boundary of HZ1 and HZ2 of well B, for example. Accordingly, the hydraulic zones of well A may be renumbered as HZ2-4, for consistency with the labels of well B. Thus, using the location of the boundaries between the zones (i.e., where the fluid codes for the hydraulic zones are determined to terminate) may allow the zones to be labeled consistently (and treated as a single hydraulic zone) between the multiple wells. Although two wells are shown, it will be appreciated that this process may be repeated for a plurality of wells (e.g., several, dozens, etc. wells).

Figure 6:
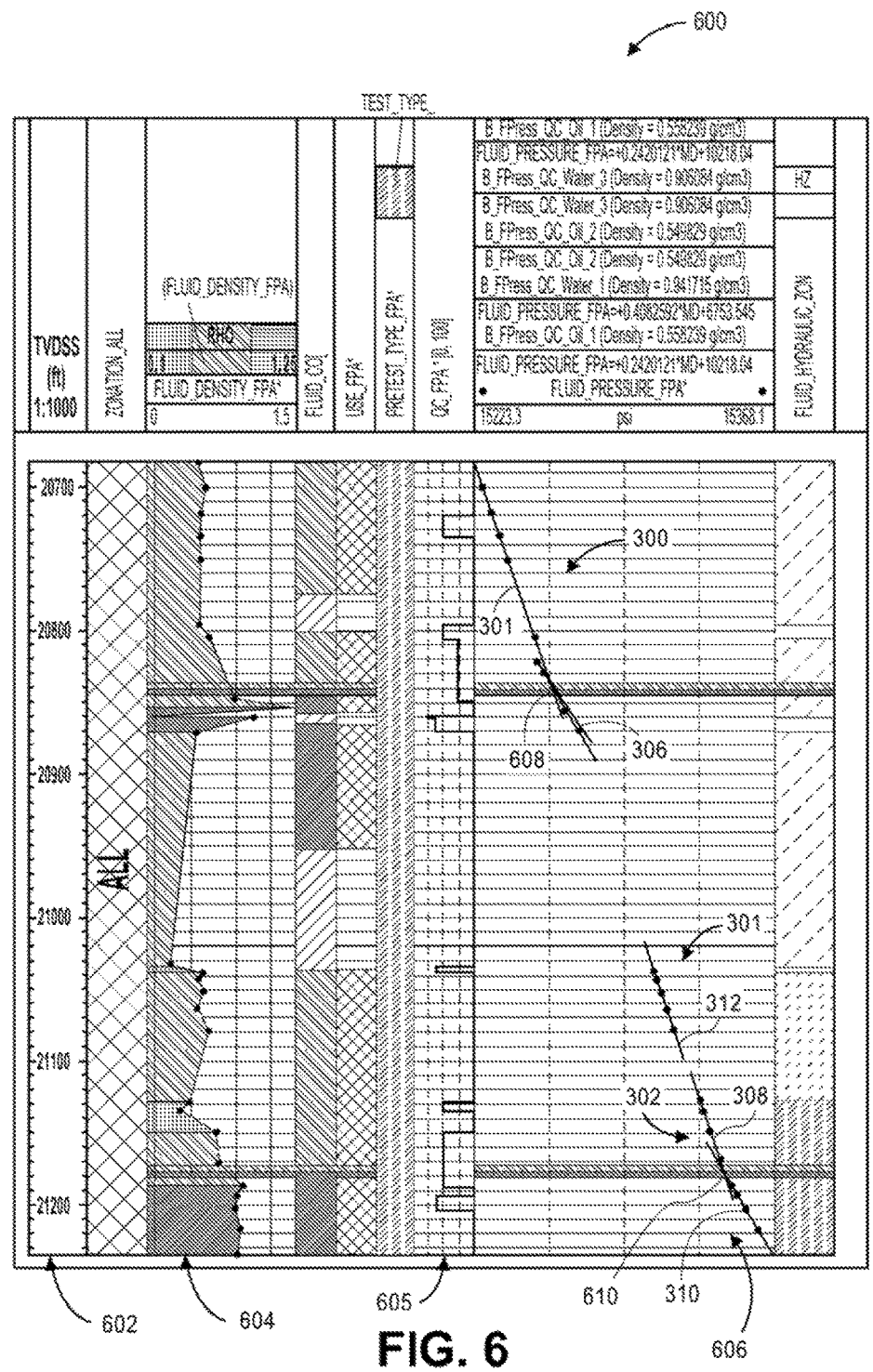
FIG. 6 illustrates a view of a report of fluid coding and hydraulic zone determination data, according to an embodiment.

As shown in FIG. 1, the method 100 may also include graphically displaying a comprehensive report 600 of the result, as at 122. FIG. 6 illustrates a view of such a report 600, according to an embodiment. The report 600 includes data regarding calculated fluid codes, hydraulic zones, and contact locations, as shown in FIG. 6, according to an embodiment. Accordingly, the report 600 may display the data in terms of depth 602, e.g., in feet, meters, or any other suitable unit of measurement as shown. The report 600 may illustrate the stratigraphy 604 of the formation, the quality control score (QC) 605, and the fluid codes 606. The fluid codes 606 may, for example, include the information depicted in FIG. 4, including fluid boundaries 608 and 610. The report 600 may be employed for further development, monitoring, or other processes.

Figure 7:
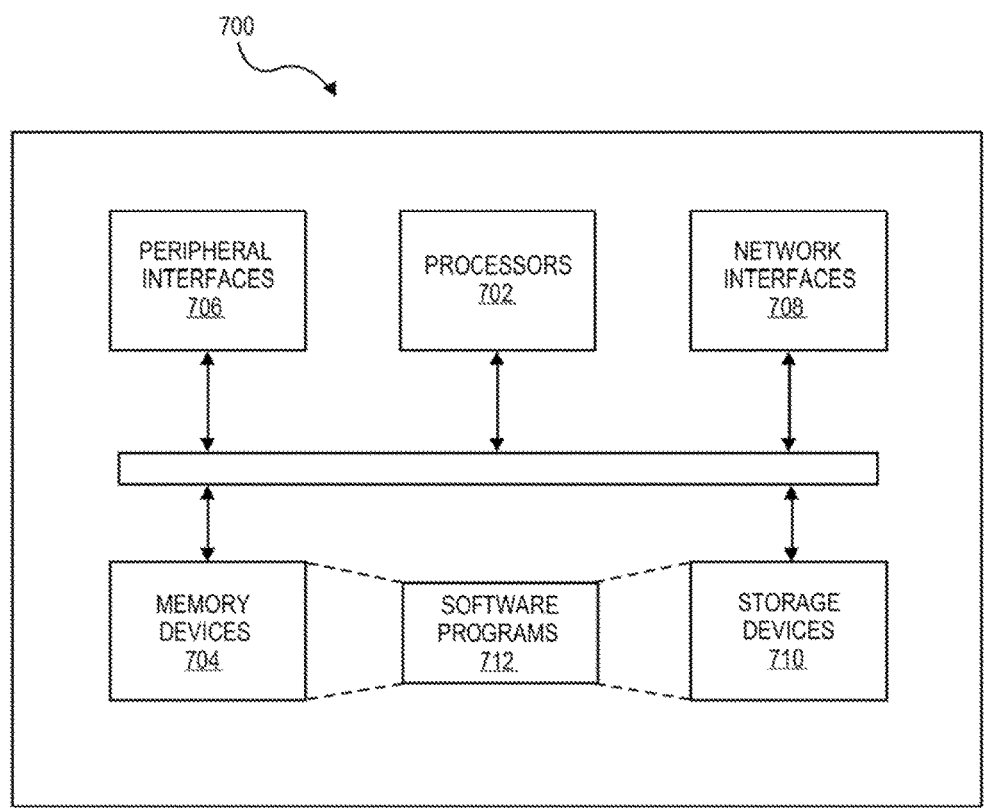
FIG. 7 illustrates a schematic view of a processor system, according to an embodiment.

Embodiments of the disclosure may also include one or more systems for implementing one or more embodiments of the method 100 of the present disclosure, for example, to provide automation to one or more portions thereof, such that they may proceed with little or no human intervention being required. FIG. 7 illustrates a schematic view of such a computing or processor system 700, according to an embodiment. The processor system 700 may include one or more processors 702 of varying core (including multiple cores) configurations and clock frequencies. The one or more processors 702 may be operable to execute instructions, apply logic, etc. It will be appreciated that these functions may be provided by multiple processors or multiple cores on a single chip operating in parallel and/or communicably linked together.

The processor system 700 may also include a memory system, which may be or include one or more memory devices and/or computer-readable media 704 of varying physical dimensions, accessibility, storage capacities, etc. such as flash drives, hard drives, disks, random access memory, etc., for storing data, such as images, files, and program instructions for execution by the processor 702. In an embodiment, the computer-readable media 704 may store instructions that, when executed by the processor 702, are configured to cause the processor system 700 to perform operations. For example, execution of such instructions may cause the processor system 700 to implement one Or more portions and/or embodiments of the method 100 described above. In such an example, the instructions of computer-readable media 704 may cause the processor system 700 to conduct formation pressure tests and/or receive measurements from one or more formation pressure tests of one or more wellbores, determine quality scores for the measurements, determine error values, filter out bad measurements, determine intermediate best-fit regressions, combine adjacent intermediate best-fit regressions to generate a fluid type regression, determine whether adjacent fluid type regressions are in the same or different hydraulic zones, calculate a fluid boundary based on intersection points between two fluid type regressions determined to be in the same hydraulic zone, calculating uncertainty of the fluid boundary location, and matching hydraulic zones determined using test results from multiple wells.

The processor system 700 may also include one or more network interfaces 706. The network interfaces 706 may include any hardware, applications, and/or other software. Accordingly, the network interfaces 706 may include Ethernet adapters, wireless transceivers, PCI interfaces, and/or serial network components, for communicating over wired or wireless media using protocols, such as Ethernet, wireless Ethernet, etc.

The processor system 700 may further include one or more peripheral interfaces 708, for communication with a display screen, projector, keyboards, mice, touchpads, sensors, other types of input and/or output peripherals, and/or the like. For example, in some embodiments, the processor(s) 702 performing aspects of the method 100 may include displaying information related to the method 100, for example, the report 600, as described above. In some implementations, the components of processor system 700 need not be enclosed within a single enclosure or even located in close proximity to one another, but in other implementations, the components and/or others may be provided in a single enclosure.

The memory device 704 may be physically or logically arranged or configured to store data on one or more storage devices 710. The storage device 710 may include one or more file systems or databases in any suitable format. The storage device 710 may also include one or more software programs 712, which may contain interpretable or executable instructions for performing one or more of the disclosed processes. When requested by the processor 702, one or more of the software programs 712, or a portion thereof, may be loaded from the storage devices 710 to the memory devices 704 for execution by the processor 702.

Those skilled in the art will appreciate that the above-described componentry is merely one example of a hardware configuration, as the processor system 700 may include any type of hardware components, including any necessary accompanying firmware or software, for performing, the disclosed implementations. The processor system 700 may also be implemented in part or in whole by electronic circuit components or processors, such as application-specific integrated circuits ASICs) or field-programmable gate arrays (FPGAs).

The foregoing description of the present disclosure, along with its associated embodiments and examples, has been presented for purposes of illustration only. It is not exhaustive and does not limit the present disclosure to the precise form disclosed. Those skilled in the art will appreciate from the foregoing description that modifications and variations are possible in light of the above teachings or may be acquired from practicing the disclosed embodiments.

For example, the same techniques described herein with reference to the processor system 700 may be used to execute programs according to instructions received from another program or from another processor system altogether. Similarly, commands may be received, executed, and their output returned entirely within the processing and/or memory of the processor system 700. Accordingly, neither a visual interface command terminal nor any terminal at all is strictly necessary for performing the described embodiments.

Likewise, the steps described need not be performed in the same sequence discussed or with the same degree of separation. Various steps may be omitted, repeated, combined, or divided, as necessary to achieve the same or similar objectives or enhancements. Accordingly, the present disclosure is not limited to the above-described embodiments, but instead is defined by the appended claims in light of their full scope of equivalents. Further, in the above description and in the below claims, unless specified otherwise, the term "execute" and its variants are to be interpreted as pertaining to any operation of program code or instructions on a device, whether compiled, interpreted, or run using other techniques.

What is claimed is:

1. A method for processing formation pressure test data, comprising:
    obtaining a plurality of rules that define whether two or more fluids in a reservoir are in a single hydraulic zone based at least in part on density, pressure, or a combination thereof;
    obtaining measurements taken during a formation pressure test;
    determining, using a processor, a plurality of regressions based on the measurements;
    determining that two or more of the plurality of regressions represent a fluid code;
    combining the two or more of the plurality of regressions representing the fluid code to generate a first fluid-type regression;
    combining two or more other ones of the plurality of regressions representing a second fluid code to generate a second fluid-type regression;
    determining that the first fluid-type regression and the second fluid-type regression are both in a first hydraulic zone by evaluating the first fluid-type regression and the second fluid-type regression against the plurality of rules;
    calculating a location of a boundary between the first fluid-type regression and the second fluid-type regression by extrapolating the first and second fluid-type regressions to a point of intersection therebetween;
    displaying a result showing the first fluid-type regression, the second fluid-type regression, the boundary between the first and second fluid-type regressions, and the first hydraulic zone, based on the measurements and the application of the plurality of rules; and
    creating a development plan for the formation based at least in part on the calculated location of the boundary.

2. The method of claim 1, further comprising determining that a third fluid-type regression, adjacent to the second fluid-type regression, is not in the first hydraulic zone.

3. The method of claim 1, wherein determining the plurality of regressions comprises:
    determining a plurality of sliding regressions, such that each of the measurements is included in at least two of the plurality of sliding regressions; and
    selecting a plurality of best-fit regressions from the plurality of sliding regressions, such that each of the measurements is included in at most one of the best-fit regressions, wherein the plurality of regressions comprises the plurality of best-fit regressions.

4. The method of claim 3, further comprising:
calculating a quality score for each of the measurements; and
adjusting the plurality of sliding regressions based on the quality score for each of the measurements of each of the plurality of sliding regressions.

5. The method of claim 4, further comprising:
calculating fit errors for the plurality of sliding regressions;
comparing the fit errors to a mean error of the fit errors for the plurality of sliding regressions; and
filtering one or more of the measurements based on comparing the error to the mean error, a proximity of the one or more measurements to one or more other measurements having a higher quality score, or both.

6. The method of claim 3, wherein the plurality of sliding regressions are three-point regressions.

7. The method of claim 1, wherein determining that two or more of the plurality of regressions represent the fluid code comprises determining that slopes of the two or more of the plurality of regressions are within a threshold amount of difference from one another.

8. The method of claim 1, wherein determining that the first fluid-type regression and the second fluid-type regression are in the first hydraulic zone comprises:
determining that the first fluid-type regression is representative of a lower pressure gradient than a pressure gradient represented by the second fluid-type regression;
determining that a deepest measurement of the first fluid-type regression is shallower than a shallowest measurement of the second fluid-type regression; and
determining that an extension of the first fluid-type regression and an extension of the second fluid-type regression intersect between the deepest measurement of the first fluid-type regression and the shallowest measurement of the second fluid-type regression.

9. The method of claim 1, further comprising calculating an uncertainty in the location of the boundary.

10. The method of claim 1, further comprising matching hydraulic zones determined at a first wellbore with hydraulic zones determined at a second wellbore based at least partially on a depth of boundaries between the hydraulic zones for each of the first wellbore and the second wellbore.

11. The method of claim 1, wherein the measurements are non-visual.

12. The method of claim 1, wherein the plurality of rules comprises:
if a density of a superposed fluid code is within a predetermined threshold of a density of a subjacent fluid code, the fluid codes are in hydraulic communication, unless one or more of the following is true:
the density of the subjacent fluid code is lower than the density of the superposed fluid code;
a pressure of the superposed fluid code is higher than a pressure of the subjacent fluid code; or
an extrapolation of a subjacent fluid code and an extrapolation of a superposed fluid code is not at an intermediate point between a deepest measurement of the superposed fluid code and a shallowest measurement of the subjacent fluid code.

13. The method of claim 12, wherein applying the plurality of rules to the first fluid-type regression and the second fluid-type regression to determine that the first fluid-type regression and the second fluid-type regression are in the first hydraulic zone comprises:
determining that the first fluid-type regression is superposed with respect to the second fluid-type regression;
determining a density of the first fluid-type regression and a density of the second fluid-type regression;
determining a pressure of the first fluid-type regression and a pressure of the second fluid-type regression;
extrapolating an intersection between the first fluid-type regression and the second fluid-type regression; and
applying the plurality of rules to the first and second fluid-type regressions, wherein the first fluid-type regression is the superposed fluid code and the second fluid-type regression is the subjacent fluid code.

14. The method of claim 1, further comprising determining an amount, a composition, or both of a reservoir fluid based in part on the results that are displayed.

15. The method of claim 1, further comprising developing a reservoir based on the reservoir development plan.

16. The method of claim 1, further comprising monitoring a reservoir based in part on the results.

17. A processor system, comprising:
one or more processors; and
a memory system comprising one or more computer-readable media storing instructions that, when executed by at least one of the one or more processors, cause the processor system to perform operations, the operations comprising:
obtaining a plurality of rules that define whether two or more fluids in a reservoir are located in a single hydraulic zone based at least in part on density, pressure, or a combination thereof;
receiving formation pressure test data;
determining a plurality of regressions for measurements of the formation pressure test data;
determining that two or more of the plurality of regressions represent a fluid code;
combining the two or more of the plurality of regressions representing the fluid code to generate a first fluid-type regression;
combining two or more other ones of the plurality of regressions representing a second fluid code to generate a second fluid-type regression;
determining that the first fluid-type regression and the second fluid-type regression are both in a first hydraulic zone by evaluating the first fluid-type regression and the second fluid-type regression against the plurality of rules;
calculating a location of a boundary between the first fluid-type regression and the second fluid-type regression by extrapolating the first and second fluid-type regressions to a point of intersection therebetween;
displaying a result showing the first fluid-type regression, the second fluid-type regression, the boundary between the first and second fluid-type regressions, and the first hydraulic zone, based on the measurements and the application of the plurality of rules; and
creating a development plan for the formation based at least in part on the calculated location of the boundary.

18. The processor system of claim 17, wherein the operations further comprise determining that a third fluid-type regression, adjacent to the second fluid-type regression, is not in the first hydraulic zone.

19. The processor system of claim 17, wherein determining the plurality of regressions comprises:

determining a plurality of sliding regressions, such that each of the measurements is included in at least two of the plurality of sliding regressions; and selecting a plurality of best-fit regressions from the plurality of sliding regressions, such that each of the measurements is included in at most one of the best-fit regressions, wherein the plurality of regressions comprises the plurality of best-fit regressions.

20. The processor system of claim 19, wherein the operations further comprise:

calculating a quality score for each of the measurements;

adjusting the plurality of sliding regressions based on the quality score for each measurement of each of the plurality of sliding regressions;

calculating fit errors for the plurality of sliding regressions;

comparing the fit errors to a mean error of the fit errors for the plurality of sliding regressions; and filtering one or more of the measurements based on comparing the fit error to the mean error, a proximity of the one or more measurements to one or more other measurements having a higher quality score, or both.

21. The processor system of claim 17, wherein determining that the two or more of the plurality of regressions represent the fluid code comprises determining that pressure gradients represented by the two or more of the plurality of regressions are within a threshold amount of difference from one another.

22. The processor system of claim 17, wherein determining that the first fluid-type regression and the second fluid-type regression are in the first hydraulic zone comprises:

determining that the first fluid-type regression represents a lesser pressure gradient than a pressure gradient represented by the second fluid-type regression;

determining that a deepest measurement of the first fluid-type regression is shallower than a shallowest measurement of the second fluid-type regression; and determining that an extension of the first fluid-type regression and an extension of the second fluid-type regression intersect between the deepest measurement of the first fluid-type regression and the shallowest measurement of the second fluid-type regression.

23. The processor system of claim 17, further comprising a display operatively coupled to the processor, wherein the operations further comprise displaying a result showing the first fluid-type regression, the second fluid-type regression, the boundary between the first and second fluid-type regressions, and the hydraulic zone using the display.

24. A method, comprising:

obtaining a plurality of rules that define whether two or more fluids in a reservoir are located in a single hydraulic zone based at least in part on density, pressure, or a combination thereof;

conducting formation pressure test by taking a plurality of measurements of formation pressure along a depth of a wellbore;

calculating a quality score of the plurality of measurements based on one or more criteria related to test conditions;

determining, using a processor, a plurality of multi-point sliding regressions of the plurality of measurements, wherein each of the plurality of measurements is included in at least one of the plurality of multi-point sliding regressions;

filtering out one or more of the plurality of measurements based at least partially on a calculated mean error in the plurality of multi-point sliding regressions;

selecting a plurality of best-fit regressions from the plurality of sliding regressions, wherein each of the measurements that is not filtered out is included one of the plurality of best-fit regressions;

combining adjacent ones of the best-fit regressions based at least partially on slope to generate a plurality of fluid codes;

determining that two or more adjacent fluid codes of the plurality of fluid codes are both in a hydraulic zone by evaluating two or more adjacent fluid codes against the plurality of rules;

determining a location of a boundary between fluid codes that are grouped into a common hydraulic zone;

displaying a result showing the first fluid-type regression, the second fluid-type regression, the boundary between the first and second fluid-type regressions, and the first hydraulic zone, based on the measurements and the application of the plurality of rules; and creating a development plan for the formation based at least in part on the calculated location of the boundary.

25. The method of claim 24, wherein calculating the quality score comprises using:

$$QC=(100-\Sigma_{k=0}^{k}(Wk \times Ck)/\Sigma_{k=0}^{k}(Wk \times 25)) \times R$$

where Wk is a weight for each of criteria Ck, R is a repeatability factor, and wherein the criteria Ck comprise:

C1: drawdown mobility: a minimum value if mobility is greater than 1 mD, a maximum value if not, wherein the minimum value is less than the maximum value;

C2: pretest volume: the minimum value if volume is greater than 5 cc, the maximum value if not;

C3: 60 second slope: the minimum value if the slope is between −0.022 psi/min (−151.7 Pa/min) and 0.022 (151.7 Pa/min) psi/min, otherwise the maximum value; and C4: gauge noise expressed as pressure variance: the maximum value if the pressure variance is greater than 0.3 psi (2.07 kPa), the minimum value otherwise.

* * * * *